United States Patent Office 3,711,301
Patented Jan. 16, 1973

3,711,301
PREPARATION OF PROTEINACEOUS
GRANULAR SEASONING
Tatsuo Asogawa, Yoshihiko Matsumura, Eiji Satani, and Shyozo Wada, Osaka, and Yoshiro Funakoshi, Kyoto, Japan, assignors to Takeda Chemical Industries, Ltd., Osaka, Japan
No Drawing. Filed July 1, 1970, Ser. No. 51,654
Claims priority, application Japan, July 1, 1969, 44/51,951
Int. Cl. A23l 1/26
U.S. Cl. 99—140 R                    14 Claims

ABSTRACT OF THE DISCLOSURE

Granular seasoning products are produced by a process which comprises extruding a hygroscopic powdery condiment composition, which consists essentially of the hydrolyzate and/or extract of plant or animal protein, in a molten state at a temperature not higher than about 130° C. through a forming die of an extruder, granulating the thus extruded shaped solids, and coating the granules with an edible and non-hygroscopic coating material.

---

The present invention relates to preparation of a granular seasoning. More particularly, the present invention relates to an industrially feasible process for preparing a granular seasoning which consists mainly of the hydrolyzate or extract of plant or animal protein and which has excellent properties for practical use.

The powdery hydrolyzates or extracts of plant or animal protein such as hydrolyzed plant protein, hydrolyzed animal protein, yeast extract, meat extract and the like have been widely employed as the flavour-enhancing condiments. However, these natural condiments are accompanied with such drawbacks that they are very hygroscopic and therefore that they rapidly become sticky absorbing water in the atmosphere to form relatively large masses under ordinary conditions. Therefore, it is advantageous to employ these natural condiments in a granular form coated with a non-hygroscopic material. But, these condiments cannot be granulated as they are owing to their high hygroscopicity, and therefore, all of the known processes comprise diluting the condiments with suitable unhygroscopic vehicles such as lactose, starch, crystalline cellulose to decrease their hygroscopicity, granulating thus obtained mixture and coating the granules with non-hygroscopic coating material. As in these known processes the non-hygroscopic vehicles should inevitably be added up to such a high concentration about 70 to about 80% by weight relative to the ultimate mixture, it is impossible to prepare granular seasoning which comprises a high concentration of the natural condiments.

Under such technical circumstances, it has been a long-standing problem in the field of food industry how to prepare granular seasoning which contains a high concentration of the natural condiments and which is non-hygroscopic.

The present inventors have unexpectedly found that when these powdery and hygroscopic natural condiments are, directly or after the addition of a suitable amount of water and/or propylene glycol, heated at a temperature hereinafter specified, they form a molten state, that the molten condiments can be extruded into a desired shape through a forming die of an extruder and that thus-obtained shaped solids can be easily granulated in a desired size.

Thus, the principal object of the present invention is to provide an industrially feasible process for preparing a granular seasoning which contains a high concentration of one or more of the said natural condiments and which has excellent properties for practical use. Another object of the present invention is to provide the said granular seasoning.

In the process of the present invention, use as the raw material is made of a hygroscopic powdery condiment composition which consists mainly of the hydrolyzate and/or extract of plant or animal protein. The term "plant or animal protein" throughout the specification and claims of the present application is meant to refer to proteinaceous materials, whichever the origin may be plant or animal, such as extracted proteins, vegetables, seeds, meats, yeasts and the like. Thus, the hydrolyzates and/or extracts of plant or animal protein include, for example, so-called "hydrolyzed plant protein" (e.g. the hydrolyzate of wheat gluten, corn gluten, solvent extracted soy bean, or cottonseed flour), so-called "hydrolyzed animal protein" (e.g. the hydrolyzates of casein, meats, or fish flour), yeast extract, meat extract and the like.

The hygroscopic powdery condiment composition to be employed as the raw material may contain other suitable flavouring ingredients such as monosodium glutamate, disodium 5′-inosinate, disodium 5′-guanylate, succinic acid, disodium succinate and the like together with the said hydrolyzate and/or the extract, but the powdery condiment composition should contain the hydrolyzate and/or the extract as the main portion, i.e. in an amount not less than 50% by weight relative to its whole weight, otherwise it is hardly possible to extrude the powdery condiment composition in a molten state through a forming die of an extruder.

The hygroscopic powdery condiment composition should contain about 2 to about 8% by weight of water or a mixture of water and propylene glycol. In the latter case the content of propylene glycol is not higher than about 5% by weight. The most preferable content of water or a mixture of water and propylene glycol ranges from about 2 to about 4% by weight. As such powdery condiment composition contains about 2 to 8% by weight of water under ordinary moisture conditions owing to the high hygroscopicity of the hydrolyzate or extract, it is generally unnecessary to add a further amount of water or propylene glycol. However, water or propylene glycol may be added, as occasion demands, to the composition in an amount sufficiently small not to make their total concentration in the composition higher than about 8% by weight relative to the whole weight of the composition.

In the first step of the present process, the hygroscopic powdery condiment composition is extruded in a molten state through a forming die of an extruder. This extrusion may be advantageously carried out with the employment of a conventional screw extruder which is popularly employed for the extrusion of plastics, e.g. polyvinylchloride resin. The screw extruder may be either a single screw type or a multiple screw type. The hygroscopic powdery condiment composition is fed into the extruder and is molten after or until it reaches the forming die. The melting of the hygroscopic powdery condiment composition is carried out by heating the composition up to a temperature not higher than about 130° C. If the composition is heated up to a temperature above about 130° C., the composition will be decomposed to cause undesirable coloration as well as scorching. Though the temperature at which the hygroscopic powdery condiment compositions start to melt varies depending upon the kinds of hygroscopic powdery condiment compositions, the compositions generally melt at a temperature not lower than about 70° C. The most advantageous temperature for the melting of the compositions ranges from about 70° C. to about 110° C.

The above-mentioned heating is effected both by artificially heating the wall of the extruder and with the spontaneous heat generated by friction between the composition and the inner parts of the extruder, especially its screw.

The molten composition is subsequently extruded through the forming die. It is advantageous to employ a forming die having the interstices at least one dimension of which ranges from about 1 to about 30 millimeters, most advantageously from about 2 to about 10 millimeters. The molten composition can be extruded into a desired shape, e.g. linear or sheet-shaped, by choosing the shape of the interstices of the forming die.

In the second step of the present process, the extruded shaped solids are subjected to granulation. This granulation step may be carried out by the per se known techniques. For example, the granulation may be conducted in the following manner: The extruded product is cut into a suitable length, e.g. about 20 to about 70 millimeters preferably after cooling to some extent, e.g. about 60° C. to about 80° C. The cut solids are further cooled to a temperature lower than about 40° C. and then is crushed to granules with a suitable crusher, e.g. Fitz mill.

From the viewpoint of the practical use of the objective granular seasoning, it is advantageous to prepare granules in the range from about 10 about 40 mesh in this second step.

Thus-prepared granules are coated with an edible and non-hygroscopic coating material (the third step). This coating step may be carried out by methods per se known with employment of the conventional coating materials in this field. As the examples of the edible and non-hygroscopic coating materials there may be mentioned starch phosphate, sodium glycolate, gum arabic, guar gum, methylcellulose, sodium polyacrylate, sodium hydroxyethylcellulose, sodium alginate, sodium glutamate, lactose, calcium lactate, calcium carbonate and the like. It is preferable to employ the coating agents in an amount from about 1 to about 50%, most desirably from about 5 to about 30%, by weight relative to the weight of the granules to be coated.

The first to third steps of the present method may be conducted continuously.

Thus-prepared granular seasonings contain a high concentration of the natural condiments such as hydrolyzed plant protein, hydrolyzed animal protein, yeast extract, meat extract and so on and have excellent properties. They are remarkably stable against moisture and therefore they keep a high fluidity on a long period of storage.

The following examples are merely for illustrative purposes and are not to be construed as the limitation of the present invention. Throughout the present specification as well as claims "mesh" is that of Tyler standard sieve and "angle of repose" is that measured by Method I described in "Journal of Pharmacy and Pharmacology," volume 10, No. 12, page 127T (1958).

The yeast extract employed in Examples 2 and 4 is one which is prepared by the following process:

20 kilograms of dried cells of food yeast (e.g. *Candida utilis* NRRL, Y-0900) is suspended in 60 kilograms of water. The suspension is adjusted to pH 3.5 with hydrochloric acid, and is kept standing at 40° C. for 3 hours. The resultant is subjected to centrifugation. The supernatant is adjusted to pH 5.5 with sodium hydroxide, and is subjected to spray-drying to give powdered yeast extract.

EXAMPLE 1

Powdery hydrolyzate of wheat gluten (moisture content of 3%), which is prepared by heating a mixture of 10 kilograms of wheat gluten and 15 liters of 24% (w./v.) hydrochloric acid at its boiling point for 20 hours in the per se established manner, is fed into an extruder of twin screw type at a feed rate of about 10 kilograms per hour and is extruded through the forming die having interstices of 3 millimeters in diameter into linear shape after kneaded at 80° C. for 5 minutes. The linear product is cooled to about 70° C., cut into about 30 millimeters in length, further cooled to about 30° C. and is then crushed into granules with Fitz mill. The granules are sieved to give those ranging from 10 to 35 mesh.

The granules are uniformly coated with monosodium glutamate by sprinkling powdery monosodium glutamate in an amount of 30% by weight relative to the weight of the granules under an increased moisture condition in a bowling granulator. The coated granules are subjected to fluidized bed drying until their moisture content decrease to about 2%.

This product is remarkably stable against moisture and keeps a high fluidity. For example, it shows 32° of angle of repose even after kept standing at 20° C. and at a relative humidity of 75% for a week.

EXAMPLE 2

Powdery yeast extract (moisture content of 4%) is subjected to extrusion and to granulation under the same conditions as described in Example 1, to give granules ranging from 10 to 40 mesh.

The granules are uniformly coated with a mixture of powdery lactose of about 30% by weight relative to the granules and of sodium hydroxyethylcellulose of about 0.1% by weight relative to the lactose after the manner described in Example 1.

The coated granules are subjected to fluidized bed drying until their moisture content decreases to about 2%.

This product is remarkably stable against moisture and keeps a high fluidity on storage. For example, it shows 34° of angle of repose even after kept standing at 20° C. and at a relative humidity of 75% for a week.

EXAMPLE 3

In an extruder of twin screw type, to the powdery hydrolyzate of wheat glulten (moisture content of 2%) is added propylene glycol in an amount of 3% by weight relative to the hydrolyzate and the mixture is extruded through the forming die having interstices of 3 millimeters in diameter into linear shape after kneaded at 80° C. for 3 minutes. The linear product is cooled to about 70° C., cut into about 30 millimeters in length, further cooled to about 30° C. and is then crushed into granules with Fitz mill. The granules are sieved to give those ranging from 10 to 40 mesh.

The granules are coated with a mixture of monosodium glutamate of about 25% by weight relative to the granules and of sodium alginate of about 0.1% by weight relative to the monosodium glutamate after the manner described in Example 1.

The coated granules are subjected to fluidized bed drying until their moisture content decreases to about 2%.

This product is remarkably stable against moisture and keeps a high fluidity on storage. For example, it shows 33° of angle of repose even after kept standing at 20° C. and at a relative humidity of 75% for a week.

EXAMPLE 4

Powdery yeast extract (moisture content of 3%) is admixed with a mixture of propylene glycol in an amount of 2% by weight and of water in an amount of 2% by weight, respectively, relative to the extract and the mixture is subjected to extrusion and to granulation under the same conditions as described in Example 3 to give granules ranging from 10 to 40 mesh.

The granules are uniformly coated with a mixture of lactose of about 30% by weight relative to the granules and of sodium hydroxyethyl cellulose of about 0.1% by weight relative to the lactose after the manner described in Example 1.

The coated granules are subjected to fluidized bed drying until their moisture content decreases to about 2%.

This product is remarkably stable against moisture and keeps a high fluidity on storage. For example, it shows 30° of angle of repose even after kept standing at 20° C. and at a relative humidity of 75% for a week.

EXAMPLE 5

Powdery hydrolyzate of casein (moisture content of 3%), which is prepared by heating a mixture of 10 kilograms of casein and 16 liters of 20% (w./v.) hydrochloric acid at its boiling point for 15 hours in the per se established manner, is subjected to extrusion and to granulation under the same conditions as described in Example 1 to give granules ranging from 10 to 35 mesh.

The granules are uniformly coated with monosodium glutamate in an amount of 30% by weight relative to the granules after the manner described in Example 1.

The coated granules are subjected to fluidized bed drying until their moisture content decreases to about 2%.

This product is remarkably stable against moisture and keeps a high fluidity on storage. For example, it shows 32° of angle of respose even after kept standing at 20° C. and at a relative humidity of 75%.

EXAMPLE 6

Powdery condiment composition (moisture content of 3%) consisting of 55% of a commercially available hydrolyzed plant protein prepared and sold by The Griffith Laboratories, Inc., Ill., U.S.A., under the trade name "Vegamine #1," 7% of sugar, 36.8% of table salt, 1% of onion powder and 0.2% of garlic powder are subjected to extrusion and to granulation under the same conditions as described in Example 1 to give granules ranging from 10 to 40 mesh.

The granules are coated uniformly with a mixture of monosodium glutamate and table salt, the amounts of both being 10% by weight relative to the said granules, respectively.

The coated granules are subjected to fluidized bed drying to the method described in "Biochemical Journal,"

EXAMPLE 7

Powdery condiment composition (moisture content of 3%) consisting of 30% of meat extract prepared according to the method described in 'Biochemical Journal," vol. 67 (1957), page 366, 30% of hydrolyzed plant protein (Vegamine #1) and 40% of lactose are subjected to extrusion and to granulation under the same conditions as described in Example 1 to give granules ranging from 10 to 40 mesh.

The granules are coated uniformly with monosodium glutamate in an amount of 20% by weight relative to the said granules.

The coated granules are subjected to fluidized bed drying until their moisture content decreases to about 2%.

Having thus disclosed the invention, what is claimed is:

1. A process for preparing a granular seasoning product which comprises extruding a hygroscopic powdery condiment composition, which consists essentially of the hydrolyzate and/or extract of plant or animal protein, and further contains about 2 to about 8% by weight of water or a mixture of water and propylene glycol, in a molten state at a temperature not higher than about 130° C. through a forming die of an extruder, granulating the thus extruded shaped solids, and coating the granules with an edible non-hygroscopic coating material.

2. A process for preparing a granular seasoning product which comprises extruding a hygroscopic powdery condiment composition, which contains as its main portion the hydrolyzate and/or extract of plant or animal protein, and further contains about 2 to about 8% by weight of water or a mixture of water and propylene glycol, in a molten state at a temperature not higher than about 130° C. through a forming die of an extruder, granulating the thus extruded shaped solids, and coating the granules with an edible non-hygroscopic coating material.

3. The process according to claim 2, wherein the composition is molten at a temperature between about 70° C. and about 110° C.

4. The process according to claim 2, wherein the composition is extruded through a forming die of a screw extruder.

5. The process according to claim 4, wherein the composition is extruded through a forming die having interstices, at least one dimension of which ranges from about 1 to about 30 millimeters.

6. The process according to claim 2, wherein the granules are in the range from about 10 to about 40 mesh.

7. The process according to claim 2, wherein the hydrolyzate is hydrolyzed plant protein.

8. The process according to claim 2, wherein the hydrolyzate is hydrolyzed animal protein.

9. The process according to claim 2, wherein the extract is yeast extract.

10. The process according to claim 2, wherein the extract is meat extract.

11. The process according to claim 2, wherein the hygroscopic powdery condiment composition contains a minor portion of at least one other flavoring ingredient.

12. A coated seasoning composition in granular form, which consists essentially of the hydrolyzate and/or extract of plant or animal protein, the coating agent being an edible non-hygroscopic material and the size of each granule being of a size in the range of about 10 to 40 mesh.

13. A seasoning composition comprising solid granules coated with an edible non-hygroscopic material, each granule being of a size in the range of about 10 to 40 mesh and containing as its main portion the hydrolyzate and/or extract of plant or animal protein.

14. The composition according to claim 13, wherein each granule contains a minor portion of at least one other flavoring ingredient.

References Cited

UNITED STATES PATENTS

| | | | |
|---|---|---|---|
| 3,480,442 | 11/1969 | Atkinson | 99—17 |
| 3,537,859 | 11/1970 | Hamdy | 99—17 |
| 3,323,922 | 6/1967 | Durst | 99—166 |
| 3,496,858 | 12/1966 | Jenkins | 99—17 |
| 3,102,031 | 8/1963 | MacAllister et al. | 99—14 |

MORRIS O. WOLK, Primary Examiner

W. BOVEE, Assistant Examiner

U.S. Cl. X.R.

99—17, 18, 110, 22, 166